United States Patent [19]

Fleming, III et al.

[11] Patent Number: 4,561,579
[45] Date of Patent: Dec. 31, 1985

[54] PRECISION SLITTING OF MATERIAL

[75] Inventors: William F. Fleming, III, Winston-Salem; Roger D. Jones, Clemmons, both of N.C.

[73] Assignee: RJR Archer, Inc., Winston-Salem, N.C.

[21] Appl. No.: 575,052

[22] Filed: Jan. 30, 1984

[51] Int. Cl.[4] .......................... B26D 7/27; B26D 9/00; B26F 3/00
[52] U.S. Cl. ......................................... 225/2; 83/51; 225/3; 225/96; 225/99
[58] Field of Search .................... 225/2, 3, 103, 95, 96, 225/99, 98; 83/51

[56] References Cited

U.S. PATENT DOCUMENTS

| | | | |
|---|---|---|---|
| 3,176,378 | 4/1965 | Janiszewski | 83/51 X |
| 3,416,347 | 12/1968 | Walsh et al. | 83/51 X |
| 3,628,710 | 12/1971 | Mannheim et al. | 225/99 X |
| 4,220,272 | 9/1980 | Danti | 83/51 X |
| 4,362,078 | 12/1982 | Ohnishi et al. | 83/51 X |

FOREIGN PATENT DOCUMENTS 2301774 7/1974 Fed. Rep. of Germany .......... 83/51

Primary Examiner—Frank T. Yost
Attorney, Agent, or Firm—Joseph E. Root, III

[57] ABSTRACT

An apparatus and method for slitting an endless strip of material having substantially planar surfaces by forming a pair of adjacent grooves in each surface of the material with corresponding grooves in each surface of the material being orthogonally aligned and applying a force normal to the planar surfaces of the material and between adjacent grooves and of sufficient magnitude to shear the material along a line connecting corresponding grooves. For this purpose a pair of scoring knives for each slit are mounted in relative orthogonal alignment with respect to the planar surfaces of the material with one on each side of the material. The knives form the adjacent grooves in each surface of the material.

6 Claims, 5 Drawing Figures

PRECISION SLITTING OF MATERIAL

BACKGROUND OF THE INVENTION

1. Field of the Invention

The present invention relates generally to an apparatus and method for slitting metal material, and particularly to an apparatus and method for slitting aluminum.

A particular application of the present invention lies in the transformer windings field, and the problem addressed and solved by the present invention relates to the slitting associated with the fabrication of aluminum strip material into narrow strips for use as transformer windings.

2. Prior Art

In many transformers aluminum strips approximately three inches in width are used as windings with a paper, resin or other insulating material interleaving between the windings. One of the difficulties encountered in cutting or slitting the aluminum strips into the required width is the burring which occurs due to the normal slitting process. The resulting burrs have an adverse effect on the transformer life as they punch the interleaving, causing the transformer to arc and, thus, shorten its life. The problem, then, is to eliminate the burring associated with slitting of the aluminum strip.

While there are devices known in the art for slitting metal material, such as disclosed in U.S. Pat. Nos. 3,416,347; 3,641,853: 3,656,379; 3,762,249: 4,109,500; and Re 27,658, we are not familiar with any device which specifically addresses the problem noted above. The U.S. Pat. No. 3,416,347 is the most significant of the group cited in terms of the stated problem. According to this patent a coiled strip material is passed through a single-knife slitting unit where the material is vertically scored along transversely spaced lines on the top and bottom thereof, then passed through a separating unit and ultimately to an edge conditioning unit where the edges of the severed strips are smoothed and rounded. The single-edge knife system taught by the patent inherently produces burred edges, requiring further edge conditioning. Smoothing and rounding the edges of severed strips is required to eliminate this burring and the resultant likelihood of puncturing the transformer interleaving. What is undesirable, however, is the requirement for a separate unit to produce this edge effect.

There is therefore a need for effectively eliminating the noted burring in a less complicated manner, i.e., with fewer elements.

OBJECTS AND SUMMARY OF THE INVENTION

One object of the present invention, therefore, is to provide the existing state-of-the-art relating to the slitting of metal strip material with an apparatus for eliminating the burring usually associated with the slitting of metal strip material without requiring specific structural elements for that purpose only.

A related object of the present invention is to provide the existing state-of-the-art relating to the slitting of metal strip material with a method according to which the burring usually associated with the slitting of metal strip material is eliminated substantially during the process of slitting.

Another object of the present invention is to provide the existing state-of-the-art relating to the slitting of metal strip material with a unique slitting apparatus which employs mechanical force to slit the strip material.

Another object of the present invention related to the last stated object, is to provide the existing state-of-the-art relating to the slitting of metal strip material with a unique method according to which the strip material is scored and severed through the application of mechanical force.

To summarize: according to the present invention, the strip material is scored (cut) such that its severed edge surfaces are smooth and preferably with square corners. The scoring is applied to both the top and bottom surfaces of the strip material without complete penetration. The scoring is preferably applied in a pattern of adjacent score lines, or grooves leaving as a result a thin remnant portion of material bounded by four grooves and attached to the material on each side by a thin web. The remnant portion thus formed has enhanced flexibility and can easily be torn. The slitting is then completed by applying a shear force normal to the remnant portion which shears the webs along a line connecting corresponding grooves.

There is no need, according to the present invention, for any further structural elements to smoothen or round the slit edges of the strip material. The present invention produces both a slitting and deburring of the material.

BRIEF DESCRIPTION OF THE DRAWINGS

Five figures have been selected to illustrate the preferred embodiment and best mode of the present invention. These figures, while schematic in most respects, are sufficiently detailed to inform those skilled in the art. Included are.

DETAILED DESCRIPTION

To demonstrate the invention in more concrete terms, a preferred embodiment has been illustrated in FIGS. 1-4.

Figure 1:
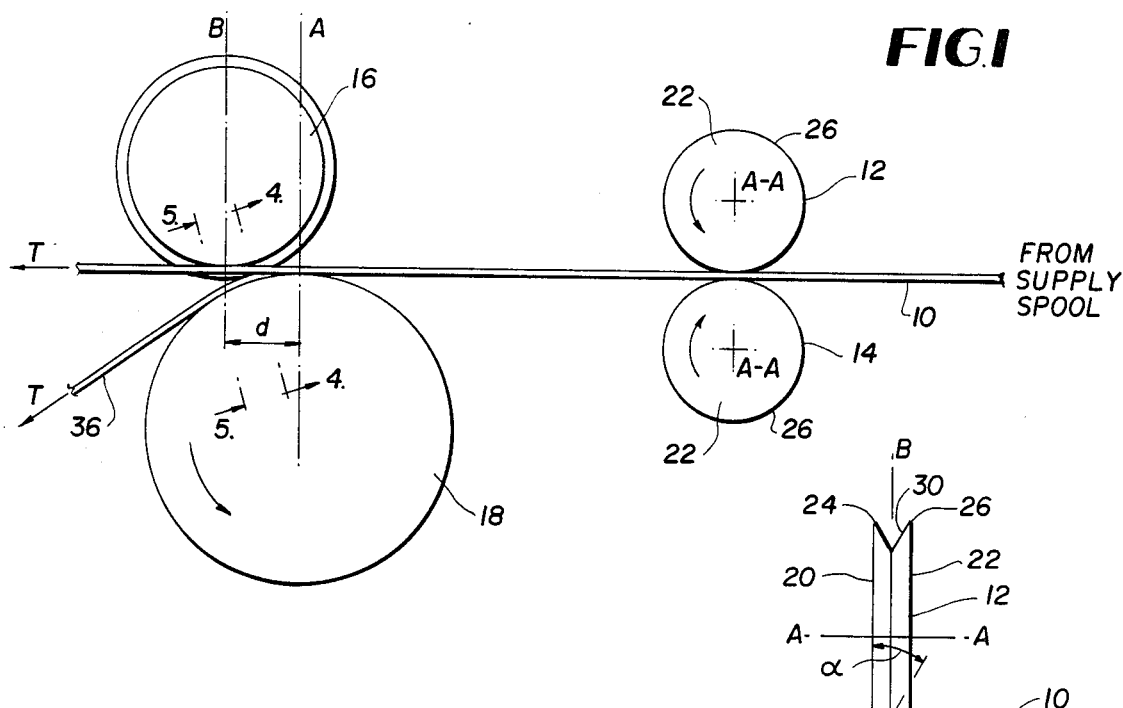
FIG. 1, which is a schematic view in side elevation illustrating the essential elements of the apparatus according to the present invention.

There is seen in FIG. 1 a supply of endless strip material 10 from a supply spool, not shown, which moves between a pair of scoring knives 12 and 14 and a force applying trim wheel 16 and idler wheel 18.

The strip material 10 is a wide strip of relatively thin gauge, such as 0.010 to 0.10 inches in thickness. Preferably the strip is slit into a number of parallel strips of lesser width by the apparatus including a series of parallel arranged scoring knives and force applying wheels. Accordingly, at least one pair of scoring knives and associated force applying wheels need be employed.

Figure 2:
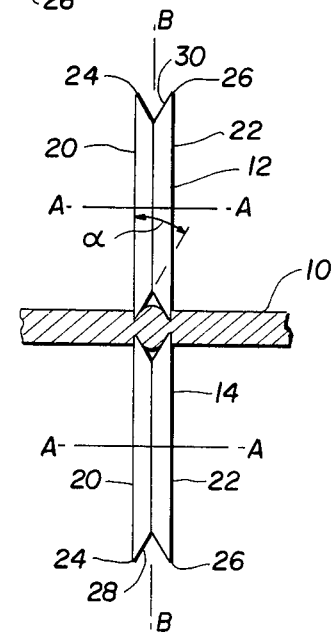
FIG. 2, which is a schematic view of the strip material subsequent to being cut by the scoring knives.

The preferred configuration of the scoring knives is as shown in FIG. 2. Each knife is mounted for rotation about an axis A—A. As such the scoring knives are mounted in relative orthogonal alignment with respect to the substantially parallel planar surfaces of the strip material. The knives preferably are not driven, but rather their rotation is imparted by the motion of the web, so that the cutting edges meet the strip material as it is advanced in the direction from right to left in FIG. 1. The advancing mechanism, which is not shown, applies a tension force T within the material back to the supply spool which "stiffens" the upper and lower surfaces of the strip material so that the scoring knives penetrate both surfaces cleanly.

Each knife 12 and 14 includes parallel outer surfaces 20, 22 which define cutting edges 24, 26 with respective inclined surfaces 28, 30. The inclined surfaces intersect at midplane B—B. The angle of inclination $\alpha$ is approximately 30°.

Figure 3:
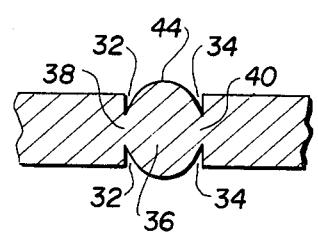
FIG. 3, which is a front elevational view of the scoring knives applying adjacent grooves to strip material forming thereby a remnant portion.

The combination of parallel outer surfaces 20 and 22 with inclined surfaces 28 and 30 produces the surprising effect of eliminating burring. As the cutting edges 24 and 26 penetrate the surface of the strip material (FIG. 2), inclined surfaces 28 and 30 exert a force directed toward the centerline of the knife, causing the metal to flow plastically in that direction. No such force is exerted by the parallel surfaces 20 and 22. The result, as seen in FIG. 3, is that outer edges of grooves 32 and 34 are square, the inner edges are inclined, and metal material has been forced into a raised or hump-backed central remnant portion 44.

The scoring knives produce a pair of adjacent grooves penetrating the strip material 10 from both the top and bottom surface. Between these grooves there is formed a remnant portion 36 which is still attached to the strip material by thin webs 38 and 40. This remnant portion is then removed by a force which shears the thin webs along a line connecting corresponding grooves 32—32 and 34—34. For this purpose the strip material 10 is advanced to the location where the trim wheel 16 and idler wheel 18 are situated.

Figure 4:
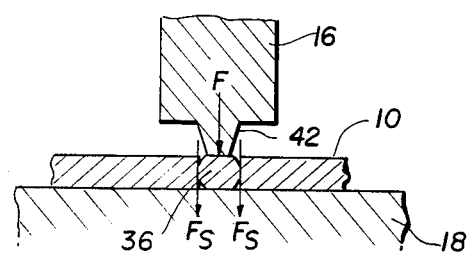
FIG. 4, which is a schematic view illustrating the force applying wheel applying a force to a remnant portion of the strip material.
Figure 5:
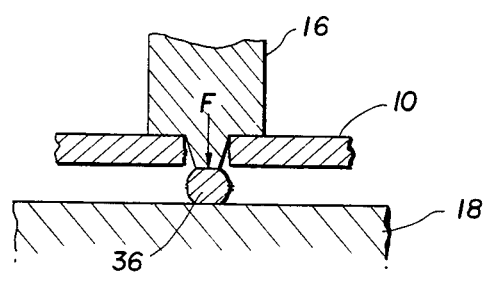
FIG. 5, which is a schematic view illustrating the force applying wheel subsequent to shearing the remnant portion of the strip material.

At this location the trim wheel 16 engages the remnant portion 36 with a force applying rim 42, as shown in FIG. 4. The engagement occurs at station A (FIG. 1). At this location the force F is introduced (FIG. 4) which resolves itself into shear force components $F_S$ at the webs 38 and 40. As the strip material continues to advance toward the left past the trim wheel and idler wheel location and the trim wheel rotates, the force F increases in magnitude until at station B the shear force components $F_S$ are of sufficient magnitude to tear the webs 38 and 40 from strip material, thereby removing the remnant portion 36 from the strip material (FIG. 5).

In order to achieve the controlled increase in the force F, the centerlines of the trim wheel 16 and idler wheel 18 are displaced a distance d (FIG. 1). This allows the force applying rim 42 to "move through" the strip material to achieve the desired removal of the remnant portion 36 (FIG. 5).

With the apparatus described the only burring which can occur would be at the shear surfaces connecting the webs 38 and 40 to the strip material as the remaining surfaces, defining the grooves 32 and 34, are smooth having the right angle corners shown at 46 (FIG. 3). The shear surfaces however are relatively thin so that burring is for practical purposes eliminated.

What is claimed is:

1. An apparatus for slitting an endless strip of material into at least two endless strips of material, the material having substantially parallel planar surfaces, comprising:
   at least one pair of scoring knives mounted in relative orthogonal alignment with respect to the planar surfaces of the material, the scoring knives of each pair of scoring knives being situated with one scoring knife on each side of the material, said scoring knives having cutting edges which form a pair of adjacent grooves in each surface of the material, said pair of adjacent grooves being orthogonally aligned; and
   force applying means associated with each pair of scoring knives for applying a force normal to the planar surfaces of the material and between adjacent grooves and of sufficient magnitude to shear the material along a line connecting corresponding grooves.

2. The apparatus as defined in claim 1, wherein each scoring knife includes substantially parallel outer surfaces and a pair of inclined intersecting surfaces, said outer surfaces and said inclined surfaces defining a pair of adjacent cutting edges.

3. The apparatus as defined in claim 1, wherein each force applying means comprises a rotatably mounted force applying wheel and an idler wheel the rotative axes of rotation of said wheels lying in spaced parallel aligned planes.

4. The apparatus as defined in claim 3, wherein the force applying wheel includes a force applying rim which engages the material between adjacent grooves.

5. A method for slitting an endless strip of material, the material having substantially parallel planar surfaces, comprising the steps of:
   forming a pair of adjacent grooves in each surface of the material with corresponding grooves in each surface of the material being orthogonally aligned; and
   applying a force normal to the planar surfaces of the material and between adjacent grooves, the magnitude of the force being sufficient to shear the material along a line connecting corresponding grooves.

6. The method as defined in claim 5, further comprising the step of:
   applying a force within the material.

* * * * *